United States Patent [19]
Coers

[11] Patent Number: 5,083,977
[45] Date of Patent: Jan. 28, 1992

[54] RASP BARS FOR DIRECTING CROP INTO AN AXIAL SEPARATOR

[75] Inventor: Bruce A. Coers, Hillsdale, Ill.
[73] Assignee: Deere & Company, Moline, Ill.
[21] Appl. No.: 669,798
[22] Filed: Mar. 15, 1991
[51] Int. Cl.$^5$ .................. A01D 41/02; A01F 7/06; A01F 12/20
[52] U.S. Cl. ........................ 460/71; 460/75; 460/80
[58] Field of Search ............ 460/71, 75, 80, 66, 460/77

[56] References Cited
U.S. PATENT DOCUMENTS

| | | | |
|---|---|---|---|
| 3,034,513 | 5/1962 | Ausherman | 460/16 |
| 3,256,887 | 6/1966 | Ausherman | 460/16 |
| 4,611,606 | 9/1986 | Hall et al. | 460/80 |
| 4,739,773 | 4/1988 | West et al. | 460/71 |
| 4,875,890 | 10/1989 | Margerum et al. | 460/66 X |

FOREIGN PATENT DOCUMENTS
3601359  7/1987  Fed. Rep. of Germany.

*Primary Examiner*—Stephen J. Novosad

[57] ABSTRACT

An agricultural combine having a transverse threshing cylinder and a pair of axial separator units wherein the angle flighting on the rasp bars of the threshing cylinder are arranged to assist in directing the harvested crop material to the inlets of the axial separator units during a threshing operation. The left hand and right hand angled flighting sections assist in forming two crop streams that are aligned with the inlets for the axial separator units.

6 Claims, 3 Drawing Sheets

RASP BARS FOR DIRECTING CROP INTO AN AXIAL SEPARATOR

BACKGROUND OF THE INVENTION

1. Field of the Invention:

The present invention is directed to using the left and right angled flighting on rasp bars of a transverse threshing cylinder to direct a harvested crop into an axial separator.

2. Description of the Prior Art:

In processing a harvested crop, the grain is separated from straw and chaff and deposited into a holding tank. With conventional combines the harvested crop is directed to a transversely mounted threshing cylinder and concave which threshes the crop separating the grain from straw. The residue is then directed to a beater further separating the grain from straw. The straw residue is then passed over oscillating apertured straw walkers which direct the straw out of the back of the combine while allowing additional grain to fall through the apertures. Grain and chaff falling from the threshing concave and straw walkers is then directed to a cleaning shoe for separating the chaff from the grain. A blower assembly is used in this final step to blow the lighter chaff away from the heavier grain.

In an axial flow combine, the grain is directed to a cylindrical tube housing a rotor. The harvested crop is threshed and separated in the cylindrical tube with the grain and chaff falling therefrom in a manner similar to the conventional combine. Case International of Racine, Wisconsin currently markets and manufactures a axial flow combine having a single rotor. Ford New Holland of New Holland, Pennsylvania currently markets and manufactures an axial flow combine having a pair of rotors mounted side-by-side.

A hybrid machine having a transverse threshing cylinder and a pair axial separating units is disclosed by the assignee of the present invention in U.S. Pat. No. 4,739,773. In this patent the harvested and threshed crop material is directed to the inlet of the axial separator units by an overshot beater. Cooperating guide vanes assist in directing the crop material to the inlets of the two axial separator units. This patent also discloses using specially shaped beaters to direct the flow of crop material from the threshing cylinder to the two axial separators units.

U.S. Pat. Nos. 3,034,513 and 3,256,887 disclose threshing cylinders having transverse rasp bars that are provided with angled flighting. Each rasp bar has left angled flighting and right angled flighting.

SUMMARY

The present invention is directed to using the angled flighting of rasp bars to better direct harvested and threshed crop material to a pair of axial separators. The transverse threshing cylinder is provided with a plurality of transverse rasp bars spaced along the circumference of the cylinder. Each rasp bar has two sections of right angled flighting and two sections of left angled flighting. All the rasp bars are identical so that as the crop material is threshed it is concentrated into two streams. The two streams correspond to the two inlets of the axial separators. In this way the crop material is directed to the axial separators by the flighting on the rasp bars.

DETAILED DESCRIPTION

Figure 1:
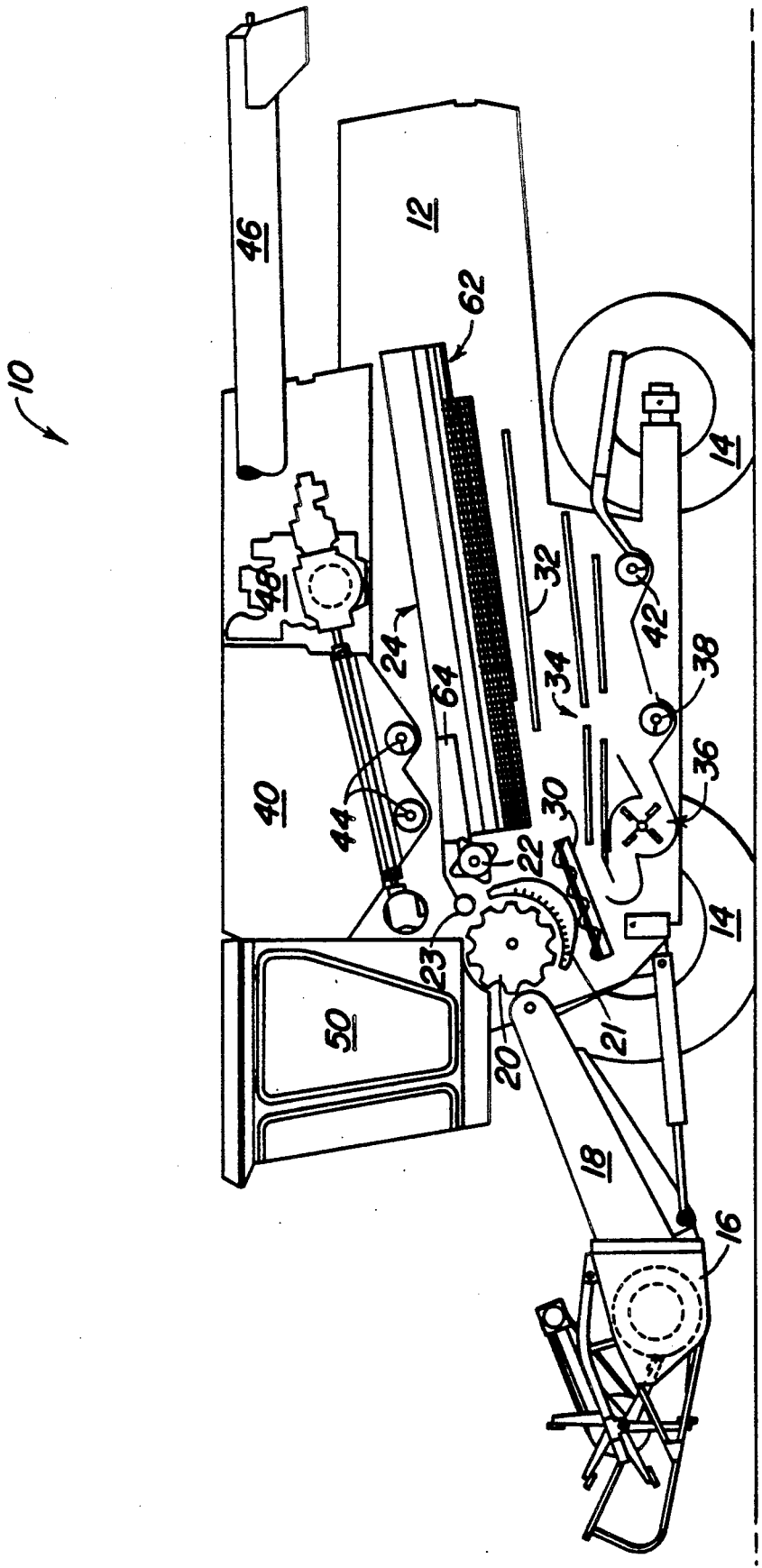
FIG. 1 is a semi-schematic side view of a combine having a transverse threshing cylinder and an axial separator.

FIG. 1 illustrates a self-propelled combine 10 having a supporting structure 12 from which depend ground engaging wheels 14. The ground engaging wheels are driven by a propulsion means (not shown), for moving the combine across a field. The forward part of the combine is provided with a harvesting platform 16 for harvesting a crop in a field and directing the harvested crop upwardly through the feederhouse 18 to the threshing and separating means. The threshing and separating means comprises a transverse threshing cylinder 20 and associated concave 21 to which the harvested crop is initially directed. The threshed crop is then directed to stripping roller 23 and beater 22 from which it enters axial separator means 24.

Grain and chaff falling from the threshing and separating means fall onto auger 30 and shaker pan 32 which directs the grain and chaff to cleaning shoe 34. The cleaning shoe is provided with a blower assembly 36 to assist in separating the grain from the chaff. Clean grain is driven by the clean grain cross auger 38 to an elevator (not shown) which directs the grain into grain tank 40. Tailings cross auger 42 directs unthreshed heads back to the threshing means through another elevator (not shown). Clean grain is unloaded from grain tank 40 through an unloading system comprising cross augers 44 and unloading auger 46.

All the various systems are driven by internal combustion engine 48. The various systems and the engine are controlled by the operator from operator's cab 50. The threshing means, separating means and cleaning means are housed within the side walls of the supporting structure.

Figure 2:
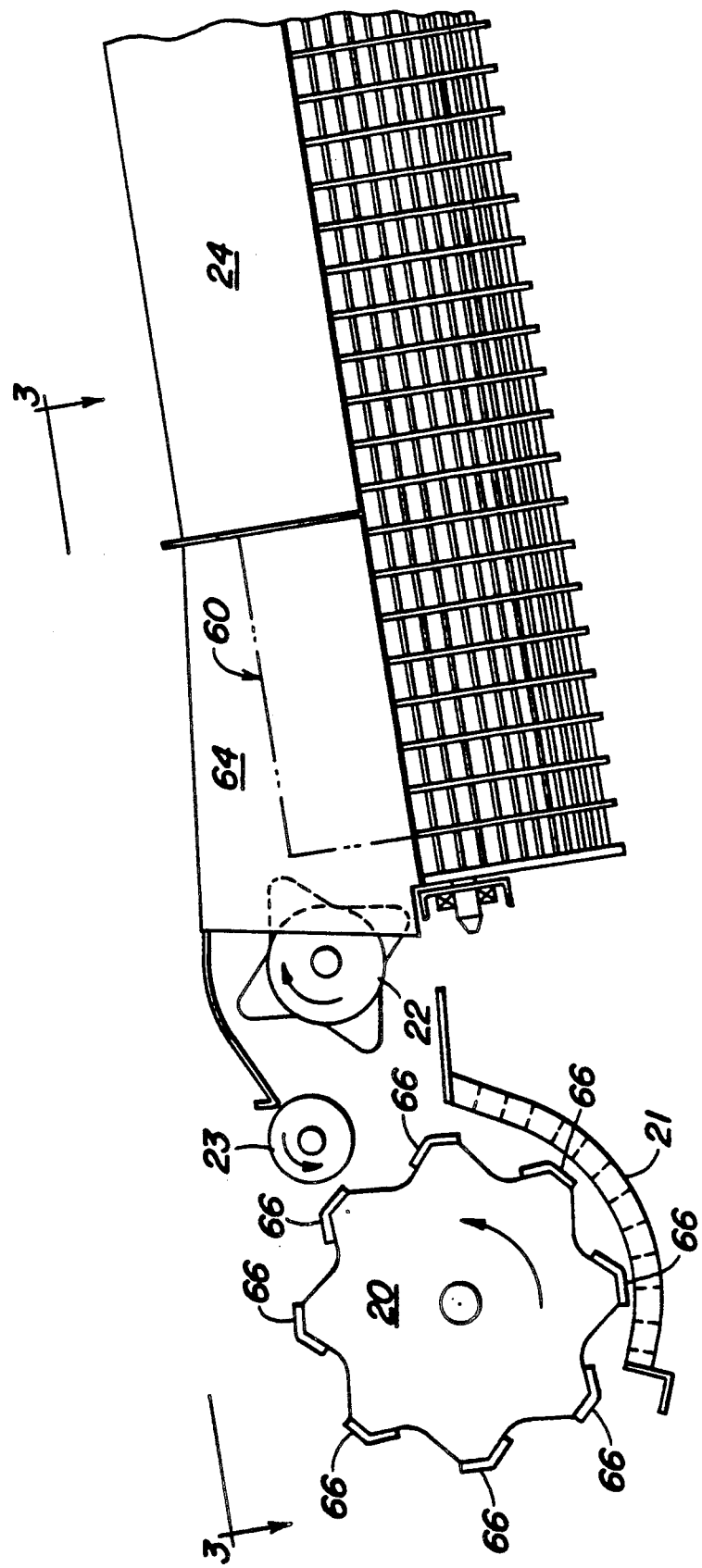
FIG. 2 is a close up side view of the transverse threshing cylinder and axial separator inlet structure.
Figure 3:
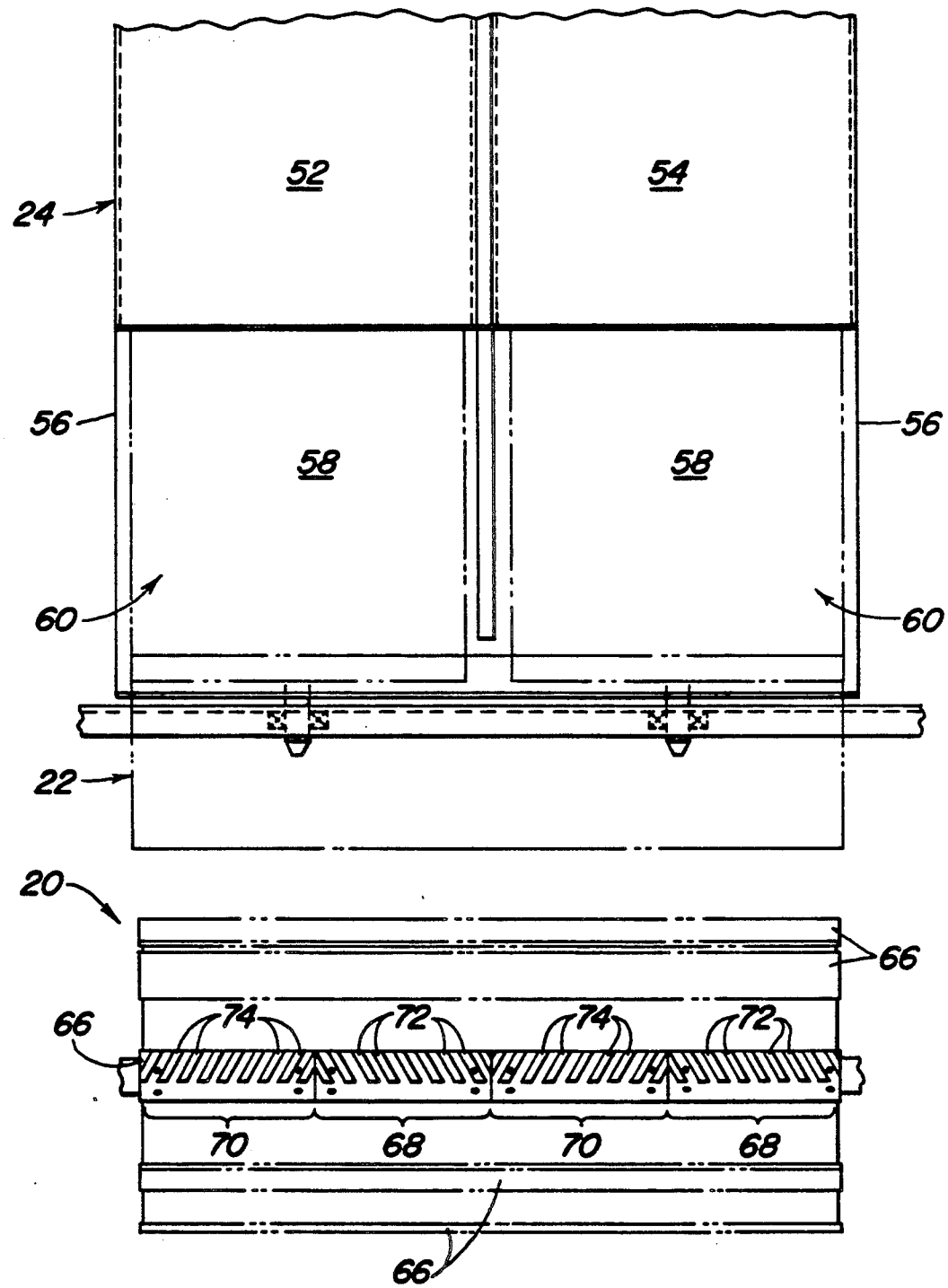
FIG. 3 is a top view of the transverse threshing cylinder and the axial separator inlet structure.

As illustrated in FIGS. 2 and 3, the axial separator means comprises a pair of axial separator units 52 and 54 arranged side-by-side. Each of the axial separator units comprise a cylindrical tube 56, a toothed rotor 58 housed in the tube, an inlet 60 and an outlet 62. Harvested and threshed crop material enters the axial separator through inlet 60.

The beater 22 together with the sheet metal inlet structure 64 direct the harvested and threshed crop into the inlets 60 of the axial separator units. The present invention assist in dividing the crop material into two streams corresponding to the inlets during the threshing operation.

The cylinder 20 is provided a plurality of transverse rasp bars 66 arranged about its circumference. As illustrated in FIG. 3, each rasp bar has four distinct sections, two sections of left hand flighting 68 and two sections of right hand flighting 70. It should be noted that the beater 22, stripper roller 23 and inlet structure 64 have been eliminated from FIG. 3 for clarity.

During threshing the ribs 72 of the left hand flighting sections draw crop material to the right, whereas the ribs 74 of the right hand flighting sections tend to draw crop material to the left. By arranging the flighting sections 68 and 70 in an alternating manner as illustrated in FIG. 3, the crop material is concentrated into two streams corresponding to the inlets of the axial separator.

The above described invention is particularly useful in a hybrid harvesting machine having a transverse threshing cylinder and one or more axial separator units. Therefore the invention should not be limited to the above described embodiment, but should be limited solely by the claims that follow.

I claim:

1. An agricultural machine for processing a harvested crop, by threshing and separating the grain contained in that crop from straw and chaff, the machine comprising:
   a supporting structure having ground engaging wheels for supporting the supporting structure;
   a transverse threshing cylinder and concave for threshing a harvested crop, the threshing cylinder is provided with rasp bars that are arranged about the threshing cylinder, the rasp bars are provided with at least one section of left hand angled flighting which directs a harvested crop to the right during a threshing operation and at least one section of right hand angled flighting which directs a harvested crop to the left during a threshing operation;
   an axial separating means that extends longitudinally within the supporting structure for separating the grain contained in a harvested and threshed crop from straw, the axial separating means having an inlet located downstream from the threshing cylinder, whereby the left hand angled flighting section and the right hand angled flighting sections of the rasp bars are arranged to direct a harvested crop into the inlet of the axial separating means.

2. An agricultural machine as defined by claim 1 wherein the axial separating means comprises a pair of axial separator units arranged side-by-side each having an inlet into which a threshed crop is directed.

3. An agricultural machine as defined by claim 2 wherein the rasp bars of the threshing cylinder are arranged transversely across the cylinder and each rasp bar is provided with two left hand angled flighting sections and two right hand angled flighting sections arranged to form two crop streams for directing the threshed crop into the inlet of the pair of axial separator units.

4. An agricultural combine for harvesting a crop from a field, for threshing and separating the grain contained in that crop from straw and chaff, the combine comprising:
   a supporting structure having ground engaging wheels for supporting the supporting structure;
   a feederhouse extending axially outward from the supporting structure, the feederhouse directing a harvested crop into the supporting structure;
   a transverse threshing cylinder and concave for receiving a harvested crop from the feederhouse, the threshing cylinder is provided with rasp bars for threshing a harvested crop, the rasp bars a transversely arranged about the threshing cylinder, each rasp bar is provided with at least one left hand angled flighting section for directing a harvested crop to the right and at least one right hand angled flighting section for directing a harvested crop to the left during a threshing operation;
   an axial separating means extends longitudinally within the supporting structure for separating the grain contained in a harvested and threshed crop from straw, the axial separating means is provided with a inlet for receiving a threshed crop, whereby the left hand angled flighting section and right hand angled flighting section direct a harvested and threshed crop into the inlet of the axial separating means.

5. An agricultural combine as defined by claim 4 wherein the axial separating means comprises a pair of axial separator units arranged side-by-side into which a threshed crop is directed.

6. An agricultural combine as defined by claim 5 wherein the rasp bars of the threshing cylinder are arranged transversely across the cylinder and each rasp bar is provided with two left hand angled flighting sections and two right hand angled flighting sections arranged to form two crop streams for directing the threshed crop into the inlet of the pair of axial separator units.

* * * * *